May 13, 1969      M. D. ACKROYD      3,443,864
TRIPLET-TYPE PROJECTION LENS
Filed Jan. 23, 1967
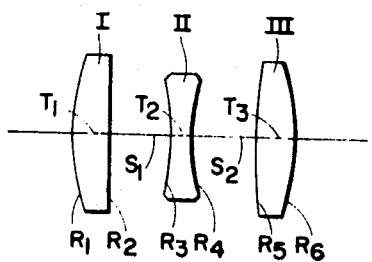
MURIEL D. ACKROYD
INVENTOR.
BY William F. Delany Jr.
Robert W Hampton
ATTORNEYS

United States Patent Office 3,443,864
Patented May 13, 1969

---

3,443,864
TRIPLET-TYPE PROJECTION LENS
Muriel D. Ackroyd, Rochester, N.Y., assignor to Eastman Kodak Company, Rochester, N.Y., a corporation of New Jersey
Filed Jan. 23, 1967, Ser. No. 611,118
Int. Cl. G02b 9/14
U.S. Cl. 350—226      2 Claims

---

ABSTRACT OF THE DISCLOSURE

A projection lens of the simple triplet type which is particularly well corrected for lateral chromatic aberration and distortion.

---

This invention relates to simple triplet projection lenses which are adapted for still photographic transparency projectors.

An object of this invention is to provide an improved simple triplet type of projection lens which is well corrected for distortion and chromatic aberrations, particularly lateral chromatic aberration.

Further objects and advantages will be found in the details of construction disclosed in the accompanying examples and drawing.

The present invention comprises a projection lens having two outer positive biconvex elements and an inner negative biconcave element. The positive elements are both formed of glass having an index of refraction $N_D$ about 1.61 and a dispersive index V about 58.8. The inner negative element is formed of glass having an index of refraction $N_D$ about 1.65 and a dispersive index V about 33.8.

The drawing shows a cross sectional view of a projection lens embodying the invention with the long conjugate on the left.

The objective in the drawing comprises three air-spaced simple lenses, designated I, II and III. The outer two lenses I and III are positive biconvex elements, and the inner lens II is a negative biconcave element.

Numerical data for constructing two embodiments of the invention as outlined above is given in the following examples in which the lens elements are numbered from front to rear, N is the index of refraction of the lens elements for the D line, V is the index of dispersion, and R, T and S refer respectively to the radii of curvature of the lens surfaces, the thicknesses of the lens elements and the airspaces between the elements, numbered by subscript from front to rear.

EXAMPLE 1
Equivalent Focal Length=100 mm.   f/3.5

| Lens | $N_D$ | V | Radii (mm.) | Thicknesses and Spacings (mm.) |
|---|---|---|---|---|
| I | 1.61 | 58.8 | $R_1=38.5$ | $T_1=7.12$ |
|   |      |      | $R_2=-562$ | $S_1=11.6$ |
| II | 1.65 | 33.8 | $R_3=-53.6$ | $T_2=3.81$ |
|    |      |      | $R_4=34.6$ | $S_2=12.3$ |
| III | 1.61 | 58.8 | $R_5=111$ | $T_3=7.52$ |
|     |      |      | $R_6=-43.4$ |  |

EXAMPLE 2
Equivalent Focal Length=100 mm.   f/2.9

| Lens | $N_D$ | V | Radii (mm.) | Thicknesses and Spacings (mm.) |
|---|---|---|---|---|
| I | 1.61 | 58.8 | $R_1=39.7$ | $T_1=7.12$ |
|   |      |      | $R_2=-529$ | $S_1=11.6$ |
| II | 1.65 | 33.8 | $R_3=-55.7$ | $T_2=3.81$ |
|    |      |      | $R_4=36.2$ | $S_2=12.3$ |
| III | 1.61 | 58.8 | $R_5=113$ | $T_3=7.51$ |
|     |      |      | $R_6=-44.5$ |  |

Although the invention has been described in considerable detail with reference to certain preferred embodiments thereof, it will be understood that variations and modifications can be effected without departing from the spirit and scope of the invention as described hereinabove.

I claim:
1. A projection lens of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.61 | 58.8 | $R_1=.385F$ | $T_1=.071F$ |
|   |      |      | $R_2=-5.62F$ | $S_1=.116F$ |
| II | 1.65 | 33.8 | $R_3=-.536F$ | $T_2=.038F$ |
|    |      |      | $R_4=.346F$ | $S_2=.123F$ |
| III | 1.61 | 58.8 | $R_5=1.11F$ | $T_3=.075F$ |
|     |      |      | $R_6=-.434F$ |  |

2. A projection lens of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|------|------|------|------|------|
| I | 1.61 | 58.8 | $R_1 = .397F$ | $T_1 = .071F$ |
|   |      |      | $R_2 = -5.29F$ | $S_1 = .116F$ |
| II | 1.65 | 33.8 | $R_3 = -.557F$ | $T_2 = .038F$ |
|   |      |      | $R_4 = .362F$ | $S_2 = .123F$ |
| III | 1.61 | 58.8 | $R_5 = 1.13F$ | $T_3 = .075F$ |
|   |      |      | $R_6 = -.445F$ | |

References Cited

UNITED STATES PATENTS 2,453,260  11/1948  Pestrecov _____ 350—226
2,736,234  2/1956  Schlumpf _____ 350—226

DAVID SCHONBERG, *Primary Examiner.*
RONALD J. STERN, *Assistant Examiner.*